US007003685B2

(12) United States Patent
Oh

(10) Patent No.: US 7,003,685 B2
(45) Date of Patent: Feb. 21, 2006

(54) APPARATUS OF CONTROLLING SUPPLY OF DEVICE DRIVE CLOCKS

(75) Inventor: Jang Geun Oh, Suwon-si (KR)

(73) Assignee: LG Electronics Inc., Seoul (KR)

( * ) Notice: Subject to any disclaimer, the term of this patent is extended or adjusted under 35 U.S.C. 154(b) by 555 days.

(21) Appl. No.: 10/128,511

(22) Filed: Apr. 24, 2002

(65) Prior Publication Data

US 2002/0174375 A1 Nov. 21, 2002

(30) Foreign Application Priority Data

Apr. 25, 2001 (KR) .......................... 2001-0022456

(51) Int. Cl.
*G06F 1/04* (2006.01)

(52) U.S. Cl. ....................................... 713/600; 713/500

(58) Field of Classification Search ................ 713/322, 713/323, 324, 600
See application file for complete search history.

(56) References Cited

U.S. PATENT DOCUMENTS 5,502,689 A * 3/1996 Peterson et al. ............ 368/156
5,628,019 A * 5/1997 O'Brien ...................... 713/322
6,021,516 A * 2/2000 Okajima et al. ............ 714/748
6,079,022 A * 6/2000 Young ........................ 713/300
6,240,522 B1 * 5/2001 Stufflebeam ................ 713/324
6,295,566 B1 * 9/2001 Stufflebeam ................ 710/302
6,496,938 B1 * 12/2002 Fry et al. .................... 713/322

OTHER PUBLICATIONS

Andrew Tanenbaum, Structured Computer Organization, 1984, Prentice Hall, Second edition, pp. 10-12.*

* cited by examiner

*Primary Examiner*—Chun Cao
(74) *Attorney, Agent, or Firm*—Fleshner & Kim, LLP

(57) ABSTRACT

The present invention relates to an apparatus of controlling supply of device drive clocks to supply device drive clocks individually to only operative devices among all devices connected to a data bus in a computer. The present apparatus consists of a clock generator generating a reference clock; a clock provider producing the device drive clocks, which are requisite for operations of a plurality of devices connected to a data bus, using the reference clock, and supplying the produced device drive clocks individually to the plurality of devices; and a controller monitoring operation states of the plurality of devices, and controlling the individual clock supply of said clock provider based on each monitored operation state. Owing to the present invention, the device drive clocks are not supplied to the operation-suspended devices, thereby reducing unnecessary power consumption in a portable computer.

11 Claims, 5 Drawing Sheets

Conventional Art

Conventional Art

Conventional Art

APPARATUS OF CONTROLLING SUPPLY OF DEVICE DRIVE CLOCKS

BACKGROUND OF THE INVENTION

1. Field of the Invention

The present invention relates to an apparatus of controlling supply of device drive clocks, more particularly, to an apparatus of controlling supply of device drive clocks to supply device drive clocks individually to only operative devices among all devices connected to a data bus in a computer.

2. Description of the Related Art

FIG. 1 is a block diagram of a general portable computer. The portable computer of FIG. 1 comprises a CPU 10 conducting ordinary well-known operations and supervising overall functions; a North bridge 12 conducting both assistant operations of the CPU 10 and management of PCI (Peripheral Component Interconnect) bus, etc.; a video chipset 11, connected to AGP (Accelerator Graphics Port) bus provided by the North bridge 12, for processing video data and outputting the processed data for video presentation; a memory 13 for storing data and programs; a network card 14, connected to the PCI bus, for interfacing the PC and data network; a clock generator 15 generating several clocks to drive other devices; a hard disk drive 17; a disk drive 19 for reading and/or writing data to and/or from a CD-ROM disk or a DVD-ROM disk; a South bridge 16, connected to the PCI bus, for controlling a high storage capacity device such as a hard disk drive and managing an ISA (Industry Standard Architecture) bus; a USB (Universal Serial Bus) controller 18 for communicating with a USB device 20 connected through a USB; a flash ROM 21 connected to the ISA bus; and an I/O chipset 23 and a microprocessor 22 for controlling I/O operations of devices such as a keyboard/mouse 24.

The North bridge 12, connected to the CPU 10 through a host bus 100 as shown in FIG. 1, provides the AGP bus 200 to the video chipset 11 and controls reading/writing operations from/to the connected memory 13. The South bridge 16, connected to the North bridge 12, the network card 14, the clock generator 15, the USB controller 18 and so forth through the PCI bus 300, provides the ISA bus 400 to which the flash ROM 21, the microprocessor 22, and the I/O chipset 23 are connected.

The South bridge 16 has an internal power management module including a device monitoring logic 16*a*, as shown in FIG. 2, which monitors the states of all devices connected to the PCI bus 300 and makes its one-bit active-low control signal 'PCI_STP-' LOW not to supply drive clocks to the devices when the monitored states indicate that they are all inactive.

In addition, the clock generator 15 is capable of supplying its own clock or not in response to the control signal 'PCI_STP-'. For such a capability, the clock generator 15, as shown in FIG. 2, comprises an internal oscillator 15*a* producing a reference clock 'CLK_Ref' of a desired high frequency; and a clock modulating/selecting unit 15*b* modulating the speed of the reference clock 'CLK_Ref' from the internal oscillator 15*a* properly for each device connected to the PCI bus 300 and distributing the speed modulated clocks 'PCI_i', where i=1 to 5, to the devices.

In detail, the clock modulating/selecting unit 15*b*, as shown in FIG. 3, includes a plurality of clock modulators 'CM i', where i=1 to 5, each of which modulates the speed of the applied reference clock 'CLK_Ref' to suitable one which is demanded by a corresponding device or devices. And, each clock modulator selectively outputs its modulated clock 'PCI_i' in response to the control signal 'PCI_STP-' from the device monitoring logic 16*a*.

According to the elements structured as above, when all devices connected to the PCI bus are inactive the device monitoring logic 16*a* makes the 1-bit control signal 'PCI_STP-' active, namely, makes transition from HIGH to LOW. Then, all clock modulators in the clock modulating/selecting unit 15*b* are disabled by the state transition of the control signal 'PCI_STP-'. As a result, the drive clocks are not supplied to all the inactive devices unnecessarily.

However, if any one of the devices connected to the PCI bus is operative, the drive clocks are all supplied to not only the operative device but also other inactive devices. Such drive clock supply to the operation-suspended devices causes unnecessary power consumption.

SUMMARY OF THE INVENTION

It is an object of the present invention to provide an apparatus of controlling supply of device drive clocks which ensures individual device drive clock supply to only active devices among all devices connected to a data bus.

An apparatus of controlling supply of device drive clocks in accordance with the present invention is characterized in that it comprises a clock generator generating a reference clock; a clock provider producing the device drive clocks, which are requisite for operations of a plurality of devices connected to a data bus, using the reference clock, and supplying the produced device drive clocks individually to the plurality of devices; and a controller monitoring which state each of the plurality of devices is in, and controlling the individual clock supply of said clock provider based on each monitored state.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFFERRED EMBODIMENT

In order that the invention may be fully understood, a preferred embodiment thereof will now be described with reference to the accompanying drawings.

Figure 4:
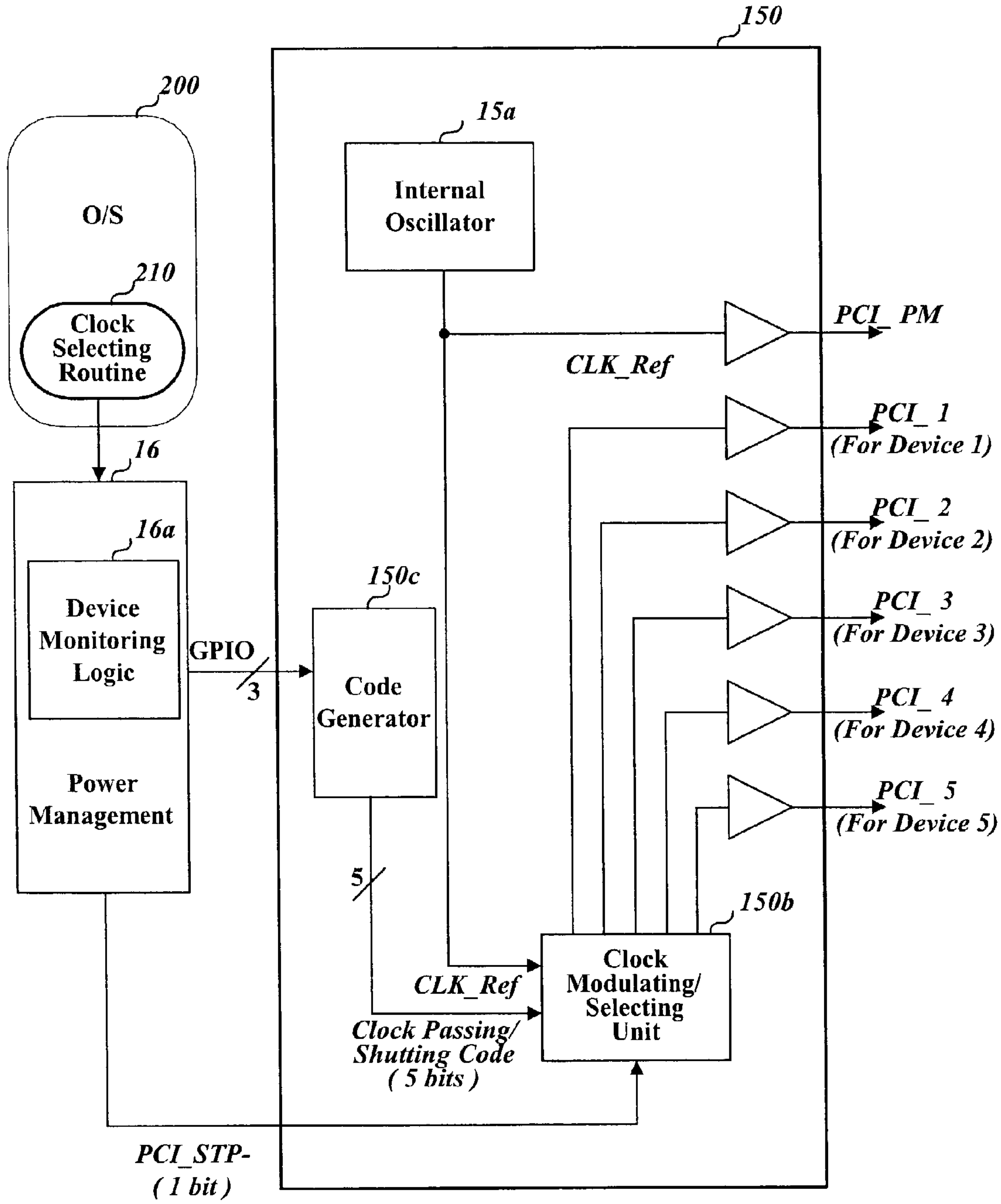
FIG. 4 is a block diagram of an embodiment of an apparatus of controlling supply of device drive clocks in accordance with the present invention.

FIG. 4 is a block diagram of an embodiment of an apparatus of controlling supply of device drive clocks in accordance with the present invention.

Figure 1:
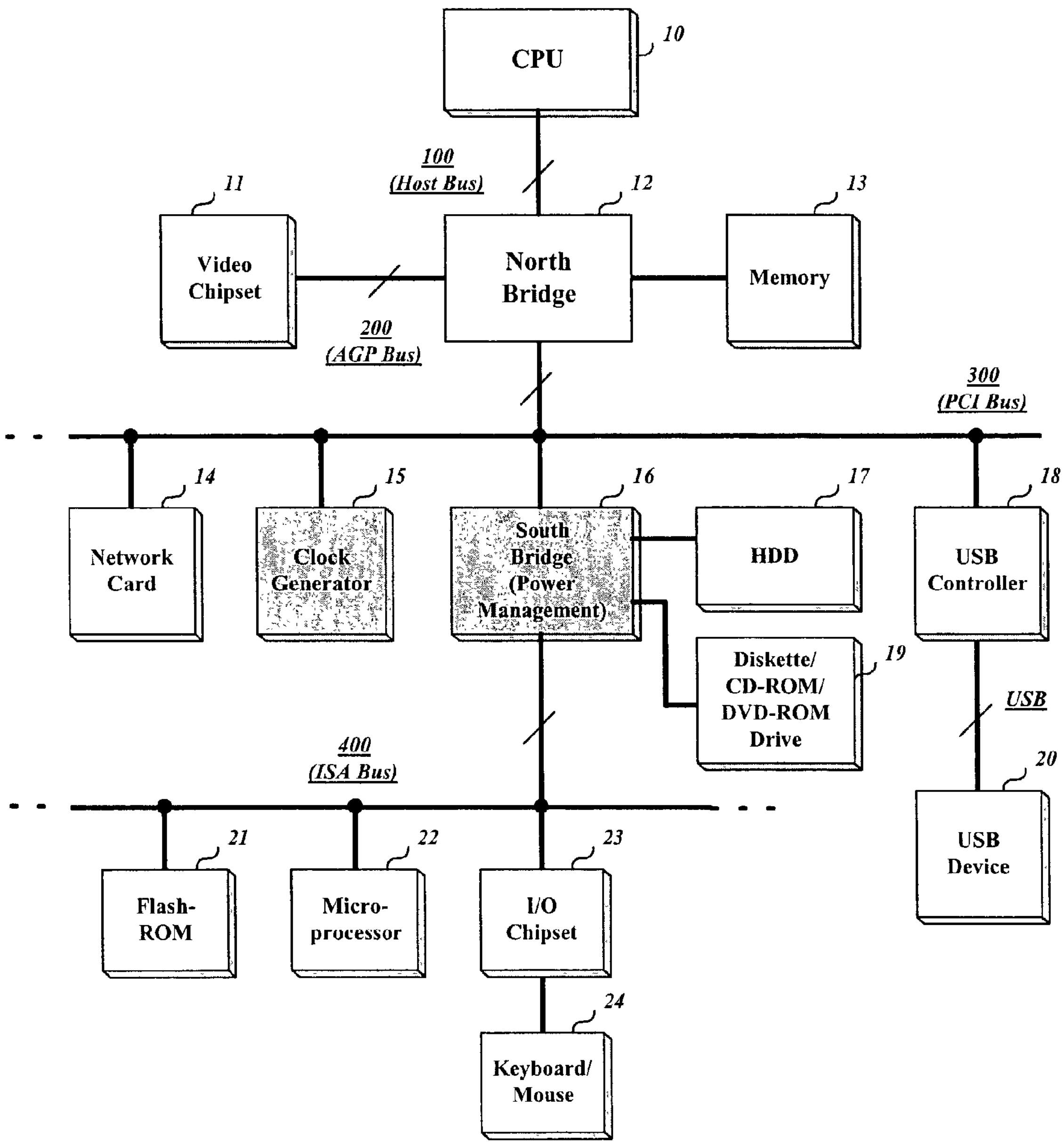
FIG. 1 is a block diagram of a general portable computer.
Figure 2:
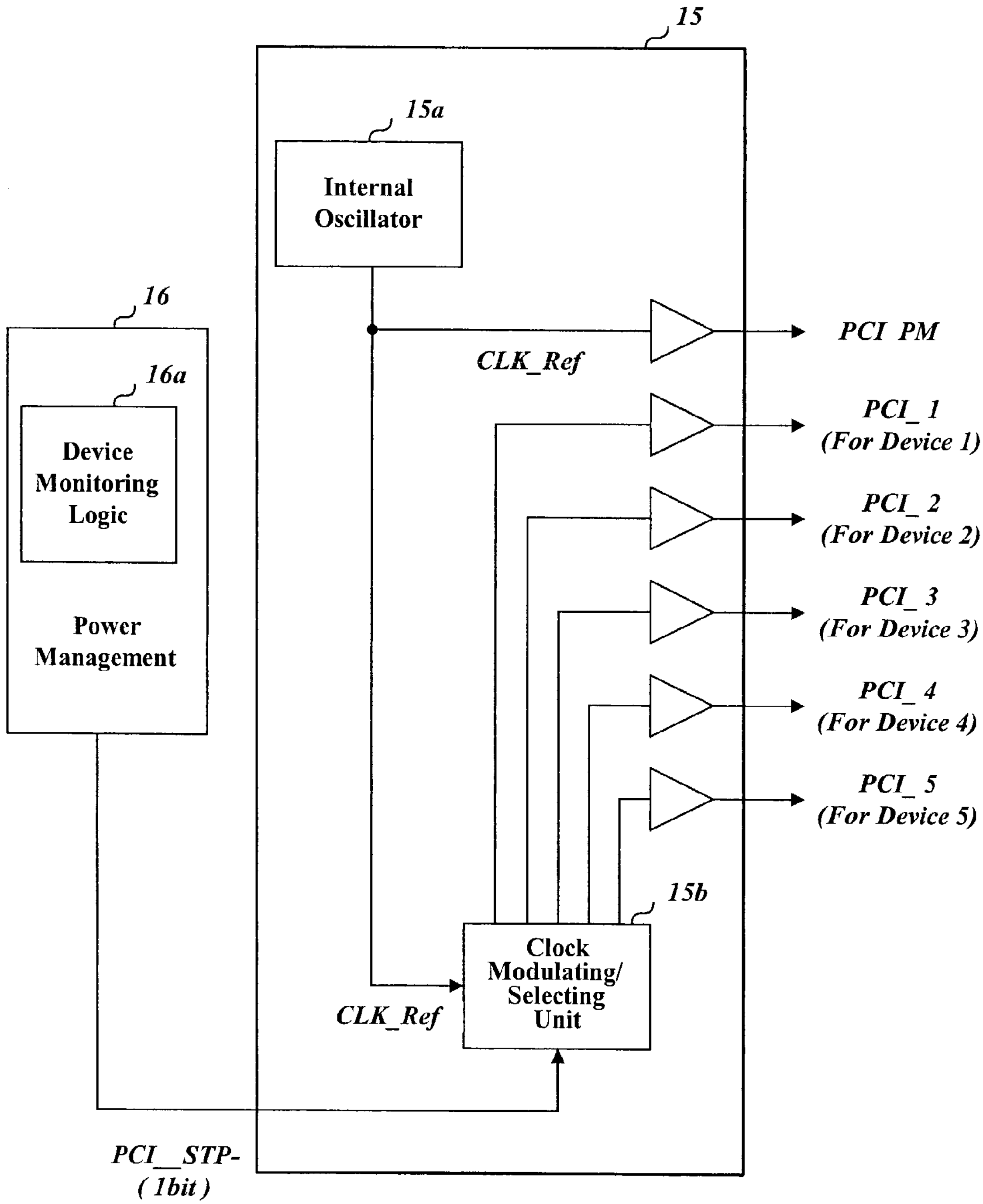
FIG. 2 is a simplified block diagram of a conventional apparatus of controlling supply of device drive clocks.
Figure 3:
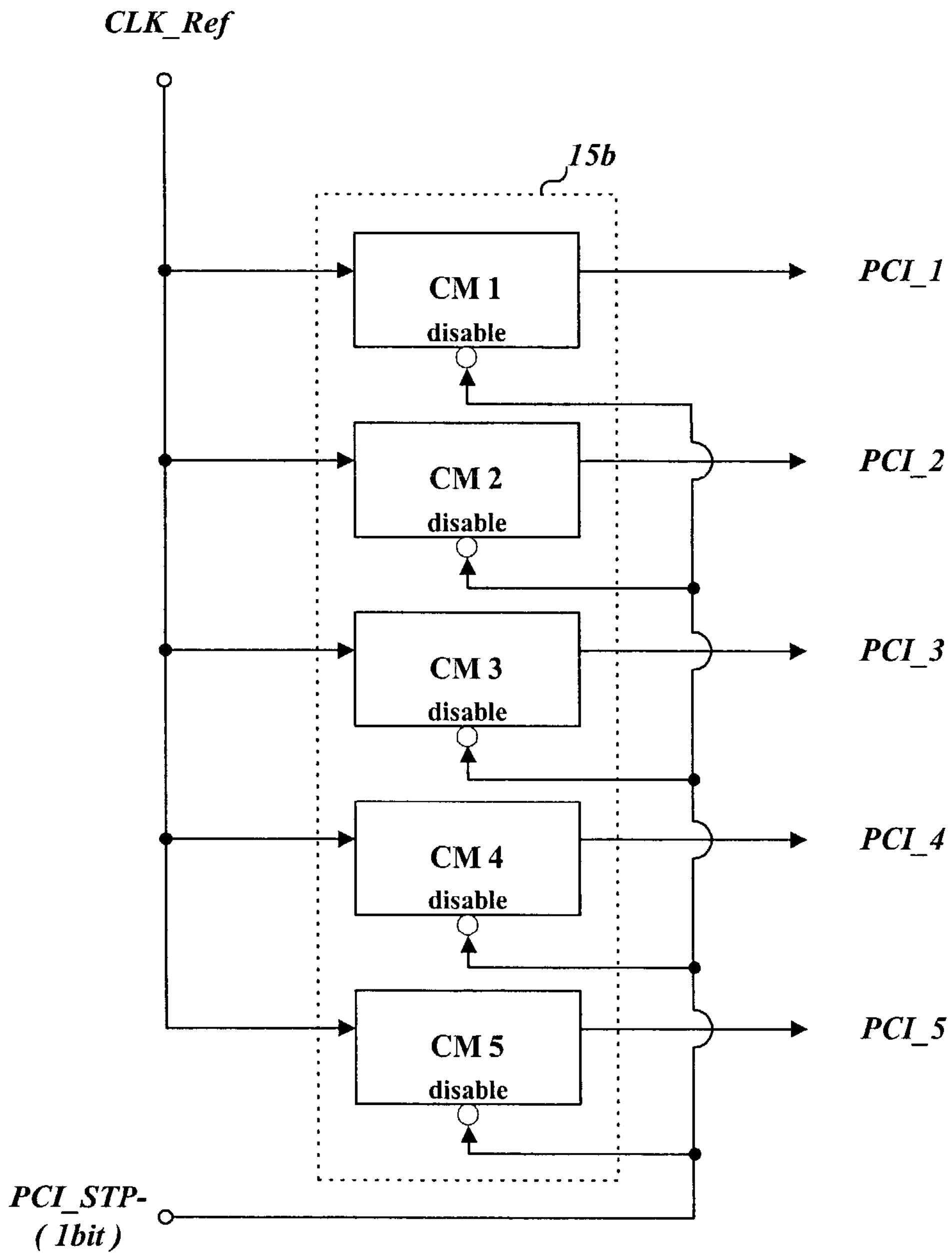
FIG. 3 is a detailed block diagram of a conventional clock modulating/selecting unit of the apparatus of FIG. 2.

The apparatus of FIG. 4 further comprises, besides conventional elements shown in FIG. 2, a clock selecting routine module 210, embedded as a device driver, producing clock supply control data based on operation states, which are informed from an O/S (Operating System) 200 of a portable computer, of every devices connected to a PCI bus; and a code generator 150*c*, embedded in a clock generator 150, producing a clock passing/shutting code corresponding to the clock supply control data.

Figure 5:
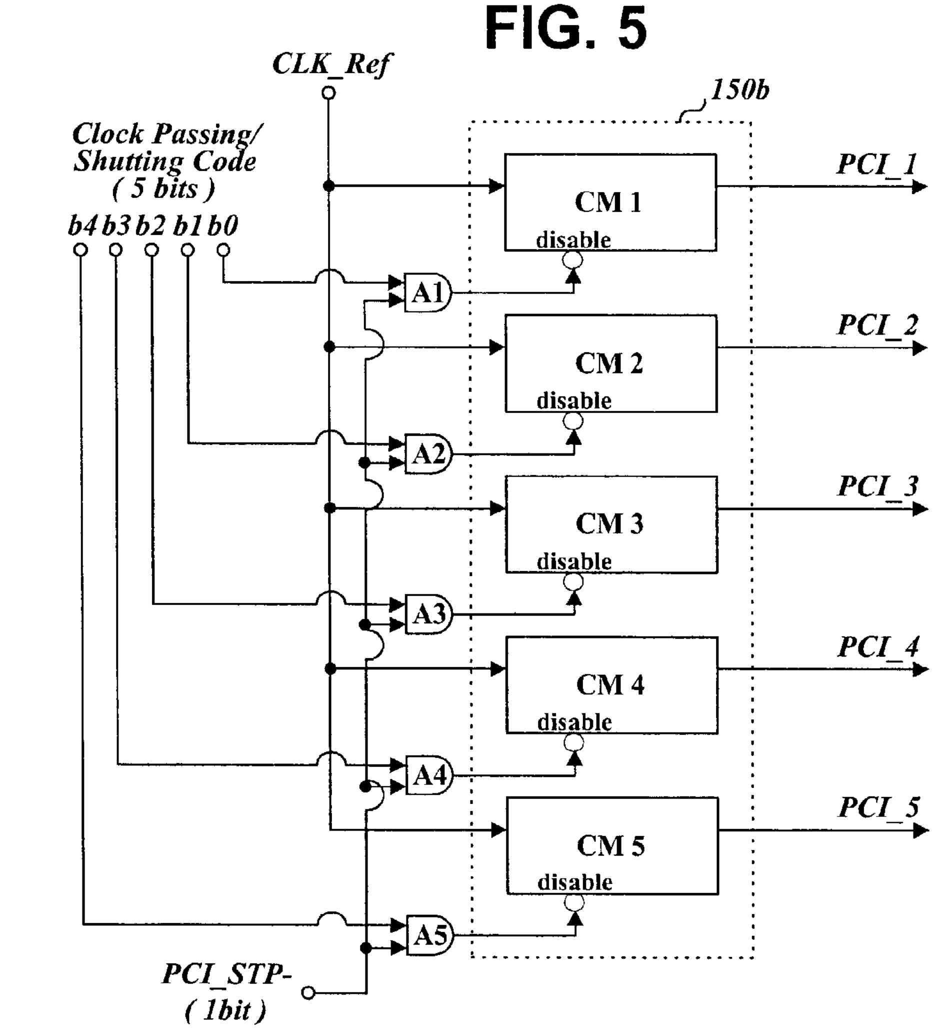
FIG. 5 is a detailed block diagram of a clock modulating/selecting unit embedded in the apparatus of controlling supply of device drive clocks in accordance with the present invention.

A clock modulating/selecting unit 150*b* embedded in the clock generator 150 is structured in detail as shown in FIG. 5. A 'disable' terminal of each clock modulator in the clock modulating/selecting unit 150*b* receives an ANDed signal of one bit of the clock passing/shutting code and the 1-bit control signal 'PCI_STP-' produced by the power management module in the South bridge 16 the same as the conventional method does.

In the apparatus structured as FIG. 4, clock supply controlling operations are conducted as follows.

The South bridge 16 conducts the same operations as aforementioned, namely, it monitors operation states of all devices connected to the PCI bus 300 and activates the control signal 'PCI_STP-' not to supply drive clocks to the devices when the monitored states indicate that they are all inoperative. The LOW state of the control signal 'PCI_STP-' immediately makes LOW the outputs of all AND gates A1 to A5 in the clock modulating/selecting unit 150*b*, disabling all clock modulators CM 1 to 5. Therefore, the modulated clocks by the clock modulators are not supplied to corresponding devices.

In other words, when all devices connected to the PCI bus are inactive, any device drive clock is not supplied to a corresponding device due to activation of the control signal 'PCI_STP-' as in conventional way.

However, if any one of the devices connected to the PCI bus is operative the control signal 'PCI_STP-' is in HIGH state, so that the clock modulators CM 1 to 5 are not disabled. Instead, unnecessary drive clock supply is shut off to save power consumption by the clock selecting routine module 210 and the code generator 150*c*.

The clock selecting routine module 210 may be executed periodically by call of interrupt service routine or may be embedded as an interrupt service routine itself which is periodically waken up. While being executed, the clock selecting routine module 210 checks current operation states of all devices, which are monitored by the O/S 200, connected to the PCI bus to know which devices are inactive. Knowing inactive devices, the clock selecting routine module 210 produces the clock supply control data to shut off drive clocks being supplied to the inactive devices, and sends the produced clock supply control data to the code generator 150*c* through a GPIO port of the South bridge 16.

Figure 6:
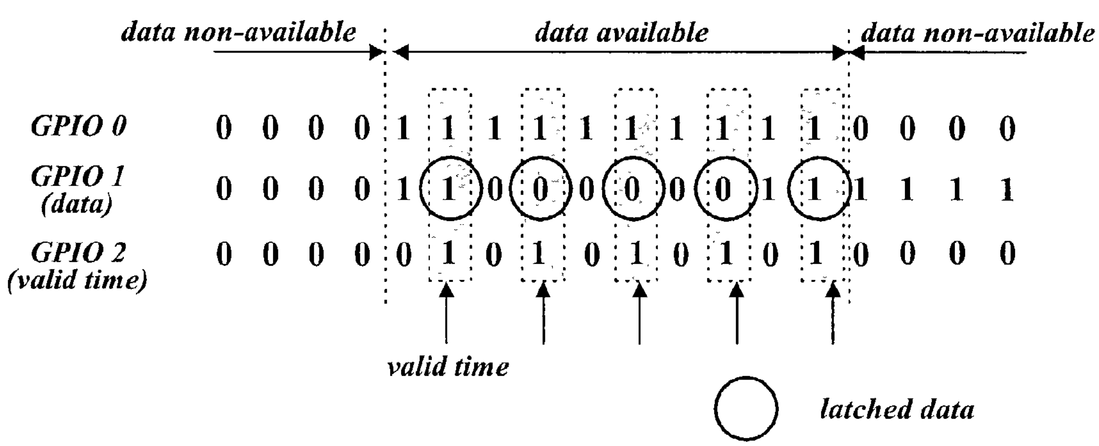
FIG. 6 shows an example of a delivery way of clock supply control data from a clock selecting routine to a clock generator.

FIG. 6 shows an example of a clock supply control data delivery way from the clock selecting routine module 210 to the code generator 150*c* through the GPIO port of the South bridge 16. Three signal lines are used for the control data delivery: the first line 'GPIO 0' of which state is in active while data is available in a data line; the second line 'GPIO 1' for carrying actual data in serial; and the third line 'GPIO 2' for indicating the time when data on the line 'GPIO 1' is valid. The third line 'GPIO 2' makes transition from inactive to active the moment the line 'GPIO 1' carries valid data bit.

Thus, the code generator 150*c* keeps checking whether the line 'GPIO 2' makes transition from inactive to active while the line 'GPIO 0' from the South bridge 16 is active. The moment the line 'GPIO 2' makes transition to active, the code generator 150*c* latches the signal on the line 'GPIO 1' and waits for next transition from inactive to active in the line 'GPIO 2'. When the next transition occurs, the code generator 150*c* latches the line 'GPIO 1' again. These operations are continued by the code generator 150*c* until the line 'GPIO 0' is changed to inactive.

FIG. 6 shows an example of control data delivery from the clock selecting routine module 210 to the code generator 150*c* on the assumption that the first and the fifth device are operative while others are inoperative. In the example of FIG. 6, the code generator 150*c* receives the serial data '10001' bit by bit and converts the received serial data to parallel one which is then applied to all the AND gates A1 to A5 simultaneously as the clock passing/shutting code.

A logic HIGH signal among the clock passing/shutting code can not affect the output of an AND gate, so that the clock modulators CM 1 and CM 5 still output their modulated drive clocks. However, a logic LOW signal among the clock passing/shutting code makes the output of an AND gate LOW unconditionally, so that the AND gates A2 to A4 whose outputs are all made to LOW disable the clock three modulators CM 2 to CM 4. Therefore, the device drive clocks are not supplied to the second, the third, and the fourth device connected to the PCI bus. Namely, the device drive clocks are not selectively supplied to the devices which need not operate.

In the above embodiment, a GPIO port of the South bridge 16 is used for delivery of the clock supply control data to the code generator 150*c* in the clock generator 150. However, a standard serial bus such as SMBus may be used instead of the GPIO port. In case of using SMBus, the code generator 150*c* should be redesigned properly to receive data through the standard SMBus.

According to the above-explained apparatus of controlling supply of device drive clocks in accordance with the present invention, the device drive clocks are not supplied to the operation-suspended devices connected to a data bus, thereby reducing unnecessary power consumption in a battery-equipped system such as a portable computer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus of controlling supply of device drive clocks requisite for operations of a plurality of devices connected to a data bus, comprising:

a clock generator generating a reference clock;

a clock provider producing the device drive clocks using the reference clock, and supplying the produced device drive clocks individually to the plurality of devices; and a controller monitoring which state each of the plurality of devices is in, and controlling the individual clock supply of said clock provider based on each monitored state, wherein said controller controls the individual clock supply of said clock provider by applying control data to said clock provider, and wherein said controller receives information about the operation states of the plurality of devices from an operating system (OS) of a computer using a software program for observing the plurality of devices, and controls the individual clock supply of said clock provider based on the received information, wherein the software program comprises a clock selecting routine module coupled to the OS for receiving operation states of the plurality of devices, and wherein the clock provider comprises a plurality of clock modulators receiving the reference clock from the clock generator, and wherein individual clock modulators are disabled responsive to said received information received from the clock selecting routine module.

2. The apparatus of claim 1, wherein the control data having bit size equal to the number of the device drive clocks.

3. The apparatus of claim 1, wherein said controller comprises:

a program being activated and executed periodically; and circuit elements converting data received from the program to other format suitable for controlling said clock provider.

4. The apparatus of claim 3, wherein the program sends the data to said circuit elements through a control device connected to the data bus.

5. The apparatus of claim 3, wherein the program sends the data to said circuit elements through a serial bus.

6. The apparatus of claim 1, wherein said clock provider further conducts a function of shutting off all the device drive clocks supplied to the plurality of devices at a time in response to another clock control signal from outside, and wherein said another clock control signal is given from a control device connected to the data bus.

7. The apparatus of claim 1, wherein the data bus is Peripheral Component Interconnect (PCI) bus.

8. The apparatus of claim 1, wherein individual clock modulators are disabled responsive to a combined signal generated by combining said another clock signal and said received information received from the clock selecting routine module.

9. The apparatus of claim 1, wherein the plurality of clock modulators are each directly connected to a corresponding one of the plurality of devices to provide a corresponding device drive clock, and wherein each clock modulator receives the reference clock.

10. An apparatus of controlling supply of device drive clocks requisite for operations of a plurality of devices connected to a data bus, comprising:

a clock generator configured to generate a reference clock;

a clock provider configured to produce the device drive clocks using the reference clock, and supply the produced device drive clocks individually to the plurality of devices;

a controller configured to monitor which state each of the plurality of devices is in, and control the individual clock supply of said clock provider based on each monitored state, wherein said controller controls the individual clock supply of said clock provider by applying control data to said clock provider, and wherein said controller receives information about the operation states of the plurality of devices from an operating system of a computer configured to use a software program to observe the plurality of devices and control the individual clock supply of said clock provider using a first control signal based on the received information; and a control device connected to the data bus and configured to monitor operation states of the plurality of devices to output a second control signal when the plurality of devices are all inoperative, wherein the clock provider comprises:

a plurality of clock modulators each directly connected to a corresponding one of the plurality of devices to provide a corresponding device drive clock, wherein each clock modulator is configured to receive the reference clock, and a plurality of logic devices configured to receive the first control signal and the second control signal and output a combined signal to one of a corresponding one of the clock modulators to selectively disable the clock modulator.

11. The apparatus of claim 10, wherein said controller comprises:

a program being activated and executed periodically; and circuit elements converting data received from the program to the first control signal suitable for controlling said clock provider.

* * * * *